(12) United States Patent
Mistry et al.

(10) Patent No.: US 10,110,875 B2
(45) Date of Patent: Oct. 23, 2018

(54) IMAGE CAPTURE SYSTEM WITH IMAGE CONVERSION MECHANISM AND METHOD OF OPERATION THEREOF

(71) Applicant: Samsung Electronics Co., Ltd., Gyeonggi-Do (KR)

(72) Inventors: Pranav Mistry, Cupertino, CA (US); Nikhil Naik, Cambridge, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 969 days.

(21) Appl. No.: 14/026,073

(22) Filed: Sep. 13, 2013

(65) Prior Publication Data

US 2014/0078266 A1 Mar. 20, 2014

Related U.S. Application Data

(60) Provisional application No. 61/702,571, filed on Sep. 18, 2012.

(51) Int. Cl.
| | |
|---|---|
| *H04N 15/00* | (2006.01) |
| *H04N 13/02* | (2006.01) |
| *H04N 13/207* | (2018.01) |
| *G03B 35/10* | (2006.01) |
| *H04N 13/00* | (2018.01) |

(52) U.S. Cl.
CPC ........... *H04N 13/207* (2018.05); *G03B 35/10* (2013.01); *H04N 13/0018* (2013.01); *H04N 13/0217* (2013.01); *H04N 13/0253* (2013.01); *H04N 13/0271* (2013.01); *H04N 13/0022* (2013.01); *H04N 2013/0081* (2013.01)

(58) Field of Classification Search
CPC ........................ H04N 13/0217; H04N 13/0228

USPC ............................................................ 348/49
See application file for complete search history.

(56) References Cited

U.S. PATENT DOCUMENTS

| | | | | |
|---|---|---|---|---|
| 5,652,616 A | * | 7/1997 | Chen | G06T 7/0022 348/42 |
| 8,290,358 B1 | * | 10/2012 | Georgiev | G03B 35/10 396/326 |
| 8,422,131 B2 | | 4/2013 | Kim et al. | |
| 2003/0076279 A1 | * | 4/2003 | Schkolnik | H04N 13/0404 345/6 |
| 2004/0263698 A1 | * | 12/2004 | Nam | H04N 13/0454 349/6 |

(Continued)

FOREIGN PATENT DOCUMENTS

| | | |
|---|---|---|
| JP | 2011182041 A | 9/2011 |
| WO | 0176260 A1 | 10/2001 |

OTHER PUBLICATIONS

DooHyun Lee and InSo Kweon. "A novel stereo camera system by a Biprism". Robotics and Automation, IEEE Transactions on, 16(5):528-541, Oct. 2000.

(Continued)

*Primary Examiner* — Jeremaiah C Hallenbeck-Huber

(57) ABSTRACT

A three dimensional image capture system includes: an image capture device configured to generate video data; a lens, coupled to the image capture device, configured to focus a left image and a right image; a microprism array, coupled to the lens, configured to horizontally deflect the left image and the right image; and an image processing unit, coupled to the image capture device, configured to calculate a depthmap from the left image and the right image in the video data, rendered by the microprism array.

20 Claims, 7 Drawing Sheets

(56) References Cited

U.S. PATENT DOCUMENTS

| | | | |
|---|---|---|---|
| 2005/0168616 A1* | 8/2005 | Rastegar | H04N 5/2259 |
| | | | 348/335 |
| 2006/0082726 A1* | 4/2006 | Suzuki | A61B 3/14 |
| | | | 351/206 |
| 2011/0050858 A1* | 3/2011 | Chen | G02B 5/045 |
| | | | 348/49 |
| 2011/0211043 A1* | 9/2011 | Benien | H04N 19/597 |
| | | | 348/43 |
| 2012/0038749 A1 | 2/2012 | Yen | |
| 2012/0057000 A1 | 3/2012 | Rohaly et al. | |
| 2012/0176475 A1 | 7/2012 | Xu et al. | |
| 2012/0176506 A1* | 7/2012 | Tajiri | H04N 5/2254 |
| | | | 348/222.1 |
| 2013/0093858 A1 | 4/2013 | Lee | |

OTHER PUBLICATIONS

Chien-Yue Chen, Ting-Ting Yang, and Wen Shing Sun. "Optics system design applying a micro-prism array of a single lens stereo image pair". Opt. Express, 16(20):15495-15505, Sep. 2008.

Yong Xiao and Kah Bin Lim. "A prism-based single-lens stereovision system: From trinocular to multi-ocular". Image and Vision Computing, 25(11):1725-1736, 2007.

Li Zhang, Brian Curless, and Steven M. Seitz. "Spacetime stereo: Shape recovery for dynamic scenes". In IEEE Computer Society Conference on Computer Vision and Pattern Recognition, pp. 367-374, Jun. 2003.

Dongbo Min, Sehoon Yea, Zafer Arican, and Anthony Vetro. "Disparity search range estimation: Enforcing temporal consistency". In Acoustics Speech and Signal Processing (ICASSP), 2010 IEEE International Conference on, pp. 2366-2369, Mar. 2010.

Dongbo Min, Sehoon Yea, and A. Vetro. "Temporally consistent stereo matching using coherence function". In 3DTV-Conference: The True Vision—Capture, Transmission and Display of 3D Video (3DTV-CON), 2010, pp. 1-4, Jun. 2010.

S.L. Kilthau, M.S. Drew, and T. Moller. "Full search content independent block matching based on the fast fourier transform". In Image Processing 2002 Proceedings. 2002 International Conference on, vol. 1, pp. 1669-1672 vol. 1, 2002.

Extended European Search Report dated Apr. 29, 2016 for European Application No. 13838185.0.

* cited by examiner

IMAGE CAPTURE SYSTEM WITH IMAGE CONVERSION MECHANISM AND METHOD OF OPERATION THEREOF

CROSS-REFERENCE TO RELATED APPLICATION(S)

This application claims the benefit of U.S. Provisional Patent Application Ser. No. 61/702,571 filed Sep. 18, 2012, and the subject matter thereof is incorporated herein by reference thereto.

TECHNICAL FIELD

An embodiment of the present invention relates generally to image capture system, and more particularly to a system for image conversion.

BACKGROUND

Modern consumer and industrial electronics, especially devices such as graphical display systems, televisions, projectors, cellular phones, portable digital assistants, and combination devices, are providing increasing levels of functionality to support modern life including three-dimensional (3D) display services. Research and development in the existing technologies can take a myriad of different directions.

3D image capturing generally requires two image capture modules: a first image capture module imitates the human left eye; and a second image capture module imitates the human right eye. The combination of the first image and the second image can present very difficult technical issues.

In conventional techniques, the first and second image capture modules, assembled in a portable electronic device with 3D, are spaced apart by a fixed distance. When a subject to be captured is very close to the device, the image difference between a first image captured by the first image capture module and a second image captured by the second image capture module may be too significant to form a 3D image.

If the first image and the second image are not properly combined, the resultant image can look unnatural or present an unnerving effect on the viewer. In many cases having an incorrect blending of the first image and the second image can result in a shadow image that can give a viewer a headache when it is observed.

Thus, a need still remains for a three dimensional image capture system with image conversion mechanism to display three-dimensional images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a three dimensional image capture system, including: an image capture device configured to generate video data; a lens, coupled to the image capture function, configured to focus a left image and a right image; a microprism array, optically coupled to the lens, configured to horizontally deflect the left image and the right image; and an image processing unit, coupled to the image capture function, configured to calculate a depthmap from the left image and the right image in the video data, rendered by the microprism array.

An embodiment of the present invention provides a method of operation of a three dimensional image capture system including: illuminating an image capture function configured to generate video data; focusing a left image and a right image, through a lens, on the image capture function; horizontally deflecting the left image and the right image from a microprism array; and calculating a depthmap from the left image and the right image in the video data.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
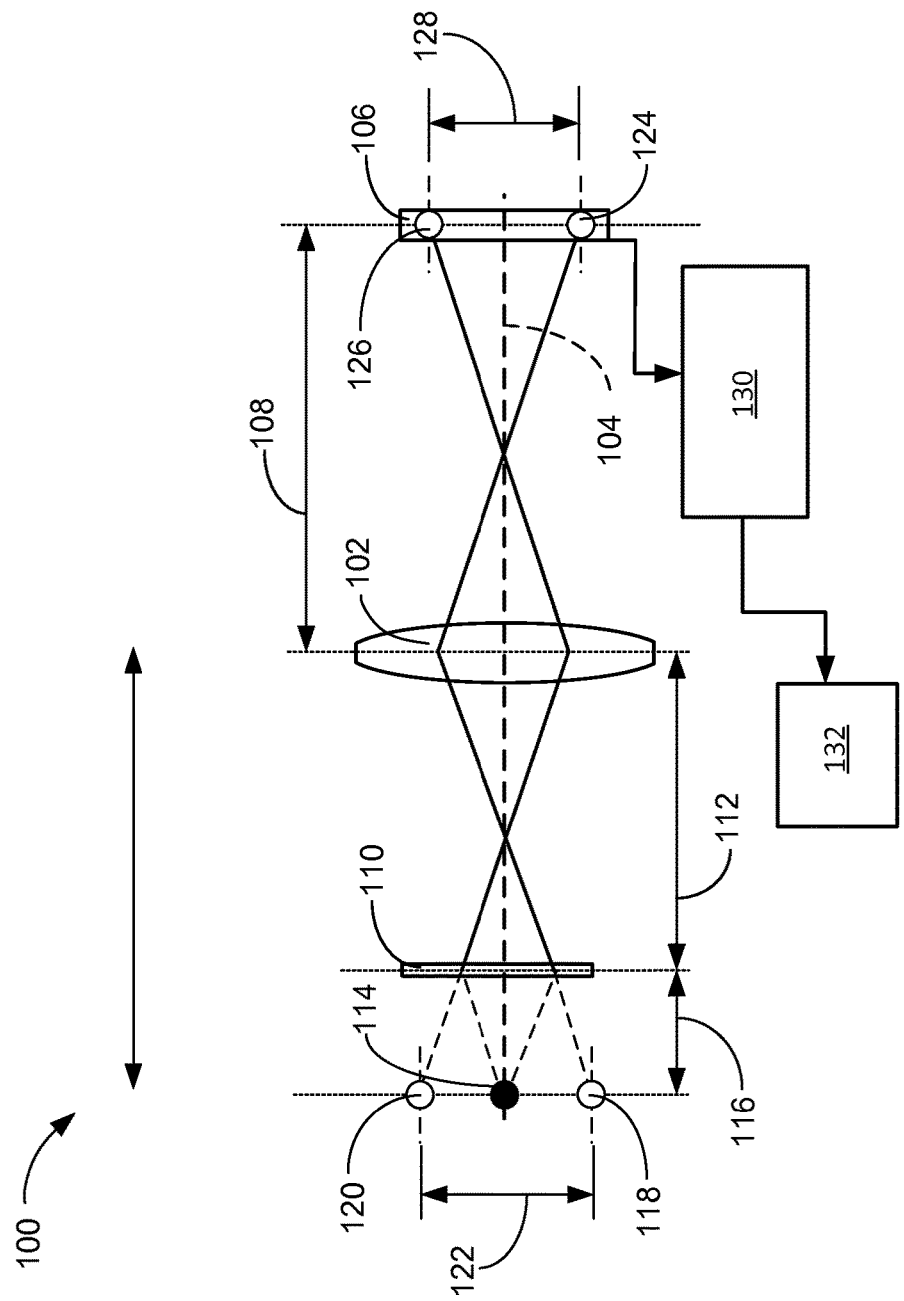
FIG. 1 is an architecture diagram of a three dimensional image capture system with image conversion mechanism in an embodiment of the present invention.

An embodiment of the present invention can provide a three dimensional image from a two dimensional camera structure. By applying the microprism array spaced away from the lens, the left image and the right image can be analyzed for forming the three dimensional image of the target object. The hardware portion of the three dimensional image capture system can predictably produce the left image and the right image for processing of the three dimensional image.

An embodiment of the present invention can provide the combination of the microprism array and the image capture function can be a less expensive and less cumbersome solution that is equivalent to a traditional stereo system consisting of two cameras placed at O separated by a baseline distance B given by $B = 2 \cdot u_z \cdot \tan(\delta)$.

An embodiment of the present invention can provide the fixed value of the deviation angle ($\delta$) can provide a standard separation of the left image and the right image on the image capture function. The standard separation of the left image and the right image can aid in the identification and correlation of matching points for producing the three dimensional image. This can reduce the circuitry required to produce the three dimensional image, while providing a detailed three dimensional display.

An embodiment of the present invention can provide a method and apparatus for developing three dimensional images from hardware that was developed for two dimensional applications. The application of the microprism array can generate the left image and the right image for a single instance of the target object and a single instance of the lens.

An embodiment of the present invention can provide the three dimensional image based on a single instance of the lens and the microprism array. The video processor can identify correspondence points by the correspondence points function, generate the depthmap, and adjust it to maintain coherence from frame to frame by the temporal coherence correction function. The three dimensional image output from the temporal coherence correction function can be a single frame or a video stream of frames with a three dimensional image of the target object.

An embodiment of the present invention can provide the search for the corresponding block which can be performed only in the row m because the microprism array only displaces the left image and the right image horizontally due to the prism vertex of the $N^{th}$ microprism and the $N+1^{st}$ microprism being vertically aligned and parallel. Any feature identified in the left image will have a corresponding feature within the same row for the right image. This allows the video processor to minimize the search time for the correspondence point.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "uniform triangular prism" is, for example, a triangular prism having equal base angles. The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an architecture diagram of a three dimensional image capture system 100 with image conversion mechanism in a first embodiment of the present invention. The architecture diagram of the three dimensional image capture system 100 includes a lens 102 having an optical axis 104. An image capture function 106, such as a charge coupled device (CCD) for detecting the output of the lens 102, can be positioned a focal distance ($f_x$) 108 from the lens 102. The image capture function 106 can be positioned behind the lens 102 parallel to the base plane P of a microprism array 110. The image capture function 106 can be an image capture device 106 or a hardware accelerator including the image capture device 106 with integrated processor support for executing process software. The microprism array 110, such as multiple uniform triangular prisms vertically aligned, can be positioned an array distance ($U_z$) 112 from the lens 102 opposite the focal distance ($f_z$) 108. The microprism array 110 can include an array of the uniform triangular prism having equal base angles. The functions described can include hardware for providing operational support, for example, hardware circuitry, processor, computer, integrated circuit, integrated circuit cores, active devices, passive devices, or a combination thereof.

A target object 114 can be positioned a picture depth ($z_p$) 116 beyond the microprism array 110. The picture depth ($z_p$) 116 can be the distance from the microprism array 110 to the target object 114. A left virtual object 118 and a right virtual object 120 can be created by the microprism array 110. The left virtual object 118 and a right virtual object 120 can be perceived to be spaced apart by a virtual object separation distance ($D_{px}$) 122. It is understood that the left virtual object 118 and a right virtual object 120 are an artifact of the microprism array 110.

The light reflecting from the target object 114 can actually follow the path from the left virtual object 118 and the right virtual object 120 through the lens 102 to illuminate the image capture function 106 in order to be detected as a left image 124 and a right image 126. The image capture function 106 can be optically coupled to the lens 102 and configured to record the left image 124 and the right image 126. The optical coupling of the lens 102 and the image capture function 106 can provide the left image 124 and the right image 126 focused on the image capture function 106 through the lens 102. The left image 124 and the right image 126, on the image capture function 106, can be spaced apart by an image separation distance ($d_{px}$) 128.

The relation between the virtual object separation distance 122 along the axis between these two virtual objects and the image separation distance 128 between their images is given by:

$$d_{px} = \frac{z_i}{z_p + u_z} \cdot D_{px} \qquad \text{Equation 1}$$

Where is is calculated by:

$$D_{px} = 2 \cdot z_p \cdot \tan(\delta) \qquad \text{Equation 2}$$

and the deviation angle ($\delta$) is calculated by:

$$\delta_m = 2\sin^{-1}\left(n\sin\left(\frac{\alpha}{2}\right)\right) - \alpha \qquad \text{Equation 3}$$

Where n is the refractive index of the material of the lens 102 and $\alpha$ is the base angle of the multiple uniform triangular prisms that form the microprism array 110. Since the microprism array 110 can include multiple uniform triangular prisms. By way of an example, the base angle α can be 45° and the deviation angle δ to be 24.6349° based on the reflective index of Acrylic glass, which is n=1.491.

An image processing unit 130 can be electrically and physically coupled to the image capture function 106. The image processing unit 130 can receive the output of the image capture function 106 including the coordinates of the left image 124 and the right image 126. The image processing unit 130 can parse the output of the image capture function 106 and coordinates in order to produce a three dimensional image of the target object 114. The image processing unit 130 can be coupled to an illumination source 132, such as a light emitting diode (LED) light source, which can be controlled to illuminate the target object 114 when there is insufficient illumination to capture the left image 124 and the right image 126. The illumination source 132 can be an Infrared source, coupled to the image processing unit 130 for activating the image capture function 106 having an Infrared mode of operation. The illumination source 132 when operating as the Infrared source will provide better segmentation of the left image 124 and the right image 126.

It has been discovered that the three dimensional image capture system 100 can provide a three dimensional image from a two dimensional camera structure at a significantly reduced cost from a stereo camera set-up. By applying the microprism array 110 spaced away from the lens 102, the left image 124 and the right image 126 can be analyzed for forming the three dimensional image of the target object 114. The image processing unit 130 of the three dimensional image capture system 100 can predictably produce the left image 124 and the right image 126 for processing of the three dimensional image.

Figure 2:
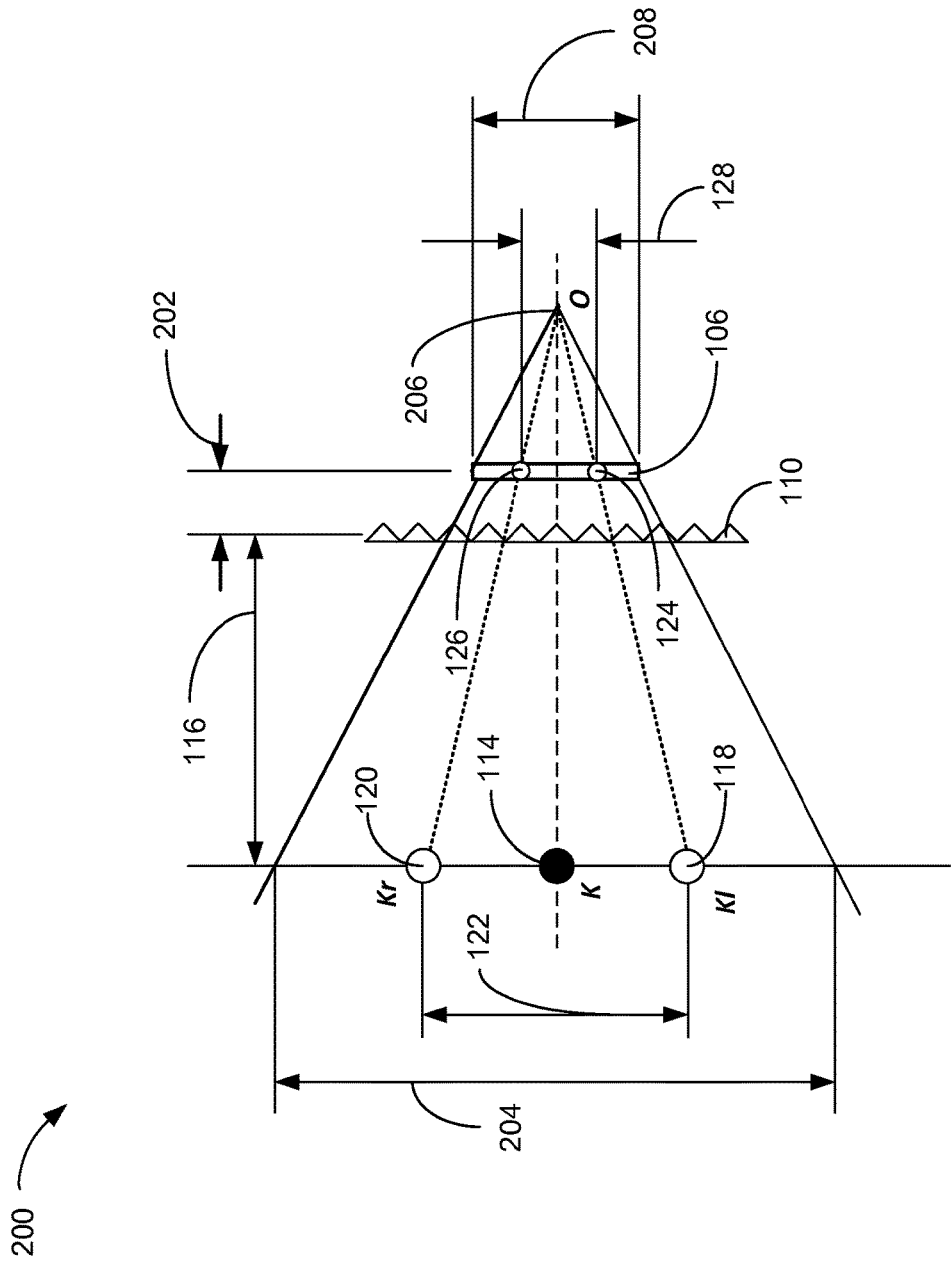
FIG. 2 is an architecture diagram of a three dimensional image capture system with image conversion mechanism in an example implementation.

Referring now to FIG. 2, therein is shown an architecture diagram of a three dimensional image capture system 200 with image conversion mechanism in an example implementation. The architecture diagram of the alternative embodiment of the three dimensional image capture system 200 depicts the microprism array 110 spaced a lens adapter length 202 from the image capture function 106. The lens adapter length 202 can be equal to the focal distance ($f_x$) 108 of FIG. 1 plus the array distance ($U_Z$) 112 of FIG. 1.

A field of view 204 can bracket the left virtual object 118 and the right virtual object 120 and the target object 114. The field of view 204 represents the widest angle that can be captured by the three dimensional image capture system 100. In order to provide sufficient information to construct a three dimensional picture of the target object 114, both of the left virtual object 118 and the right virtual object 120 must be within the field of view 204. The construction of the three dimensional picture of the target object 114 represents a foreground process provides objects at a greater distance in a two dimensional background. It is understood that objects close to a viewer can be dimensionally detailed while more distant objects have less identifiable depth and are relegated to the background.

As an example an ideal pinhole camera placed at an optical center 206 will have the following characteristics. The Z axis can be along the optical axis 104 of the three dimensional image capture system 100. The base plane of the microprism array 110 is parallel to the image plane of the image capture function 106. The microprism array 110, can be made up of uniform triangular prisms, with base angle α can be placed at the array distance ($U_Z$) 112 from the image capture function 106.

The target object 114 can be designated by K at location [$x_p$, $y_p$, $z_p$], two virtual object points can be horizontally displaced by the microprism array 110, $K_l$ at location [$x_{pl}$, $y_p$, $z_p$] and $K_r$ at location [$x_{pr}$, $y_p$, $z_p$]. The horizontal displacement of the left virtual object 118 and the right virtual object 120 is shown by the difference in the displacement in the x-axis with no change in the y-axis or z-axis displacement. The virtual object separation distance ($D_{px}$) 122 along the X axis between the left virtual object 118 and the right virtual object 120 can be given by:

$$D_{px}=x_{pr}-x_{pl}=2 \cdot z_p \cdot \tan(\delta)$$ Equation 4

The pinhole camera of the example, with optical center 206 at O, captures the left image 124 and the right image 126 of the left virtual object 118 and the right virtual object 120, $K_l$ and $K_r$. A width 208 of the image capture function 106 (along X axis) can be W and a height (along Y axis) can be H, both in pixel units. The field of view 204 displayed horizontally, can be considered the angular aperture of the three dimensional image capture system 100 is ϕ. The horizontal focal length of the camera can be given by:

$$f_x = \frac{w}{2 \cdot \tan(\phi/2)}$$ Equation 5

The left virtual object 118 and the right virtual object 120 can be located at the picture depth $z_p$ according to the co-ordinate system. The horizontal disparity in pixel units (along X axis) between the left image 124 and the right image 126, $I_l$ and $I_r$ can be given by:

$$d_{px} = \frac{D_{px}}{z} \cdot \frac{(W/2)}{\tan(\phi/2)}$$ Equation 6

The picture depth ($z_p$) 116 of the target object 114 from the optical center 206 can be equal to $z_p+u_z+f_x$. Substituting values of $D_{px}$ and $f_x$ in Equation 5, we obtain the relation between horizontal disparity in pixel units in the left image 124 and the right image 126 and the depth of the object in the co-ordinate system can be calculated by:

$$d_{px} = \frac{2 \cdot z_p \cdot \tan(\delta)}{z_p + u_z + f_x} \cdot \frac{(W/2)}{\tan(\phi/2)}$$ Equation 7

It has been discovered that the combination of the microprism array 110 and the image capture function 106 can be a less expensive and less cumbersome solution that is equivalent to a traditional stereo system consisting of two cameras placed at O separated by a baseline distance B given by:

$$B=2 \cdot u_z \cdot \tan(\delta)$$ Equation 8

Figure 3:
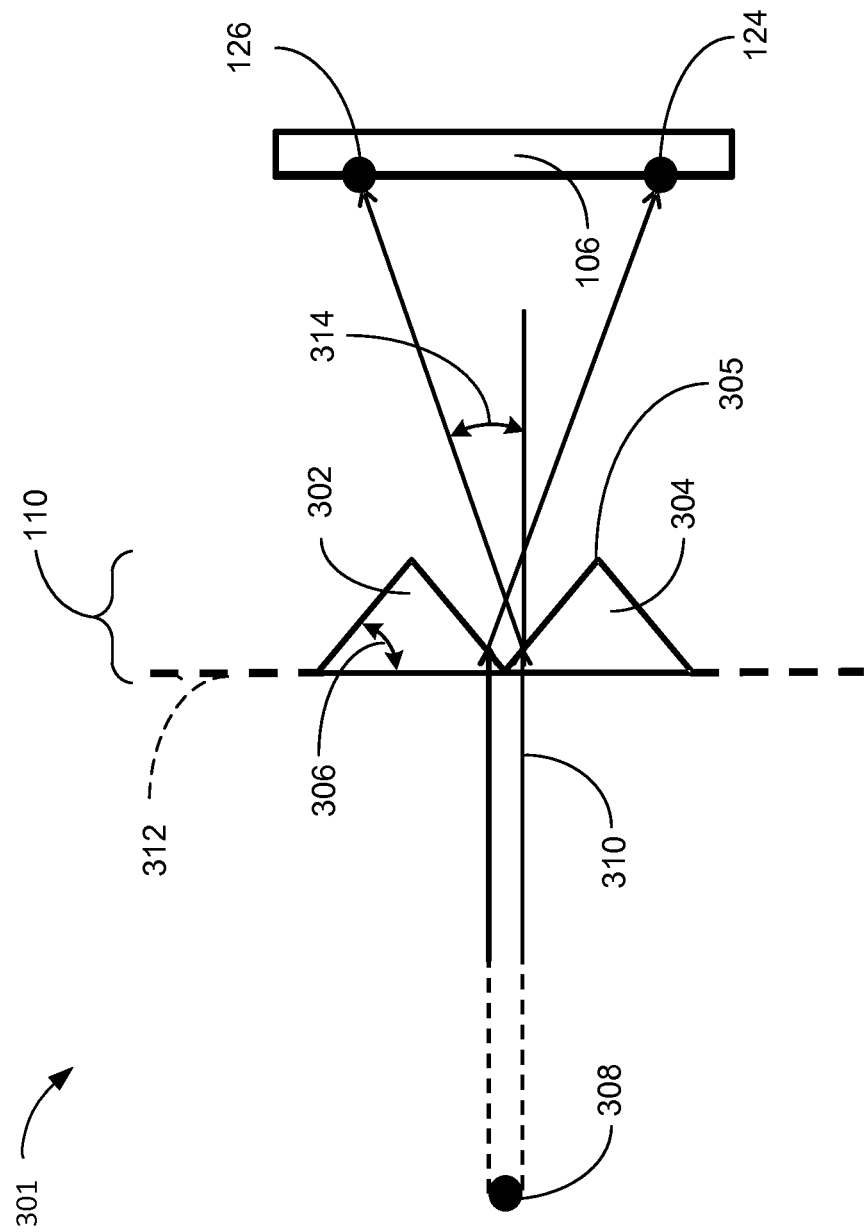
FIG. 3 is an exemplary block diagram of the three dimensional image capture system.

Referring now to FIG. 3, therein is shown an operational block diagram of an image capture process 301. The operational block diagram of the image capture process 301 can include an $N^{th}$ microprism 302 and a $N+1^{st}$ microprism 304, of the microprism array 110, vertically-aligned. The $N^{th}$ microprism 302 and the $N+1^{st}$ microprism 304 can each be the uniform triangular prism, such as a triangular prism, having equal base angles and a prism vertex 305 with vertical and parallel alignment.

By way of an example, the $N^{th}$ microprism 302 and the $N+1^{st}$ microprism 304 can be right triangular prisms having their equal base angles emanate from a common plane. The $N^{th}$ microprism 302 and the $N+1^{st}$ microprism 304 are abutted in order to form the microprism array 110. It is understood that the number N can be any positive integer.

The $N^{th}$ microprism 302 and the $N+1^{st}$ microprism 304 can each have equal base angles 306. A light source 308, such as a parallel light source or a laser, spaced at an extreme distance can provide light rays 310 perpendicular to a microprism base plane 312.

The microprism array 110 can be made up of the $N^{th}$ microprism 302 and the $N+1^{st}$ microprism 304, such as dispersing prisms, with the prism vertex 305 vertically aligned for each of the microprisms 302 in the microprism array 110. The light rays 310 entering the $N^{th}$ microprism 302 and the $N+1^{st}$ microprism 304, will emerge having been deflected horizontally from their original direction, by an angle δ known as a deviation angle (δ) 314. The smallest value of the deviation angle (δ) 314 can be the 'minimum deviation', $δ_m$. A uniform triangular prism has identical values of the base angle 306, which we denote by α. If the refractive index of the material of the prism can be n, the relation between minimum deviation angle δ and base angle α can be calculated by a processor, such as an embedded control processing unit, an array processor, numerical control processor, or a combinational logic processor.

The deviation angle (δ) 314 can be calculated by:

$$\delta_m = 2\sin^{-1}\left(n\sin\left(\frac{\alpha}{2}\right)\right) - \alpha \qquad \text{Equation 3}$$

Where n is the refractive index of the material of the lens 102 of FIG. 1 and a is the base angle of the multiple uniform triangular prisms that form the microprism array 110. Since the microprism array 110 can include multiple of the uniform triangular prisms. The base angle (α) 306 can be equal to 45° and the deviation angle (δ) 314 can be equal to 24.6349° based on the reflective index of Acrylic glass, which is n=1.491.

It has been discovered that the fixed value of the deviation angle (δ) 314 can provide a standard separation of the left image 124 and the right image 126 on the image capture function 106. The standard separation of the left image 124 and the right image 126 can aid in the identification and correlation of matching points for producing the three dimensional image. This reduces the circuitry required to produce the three dimensional image, while providing a detailed three dimensional display.

Figure 4:
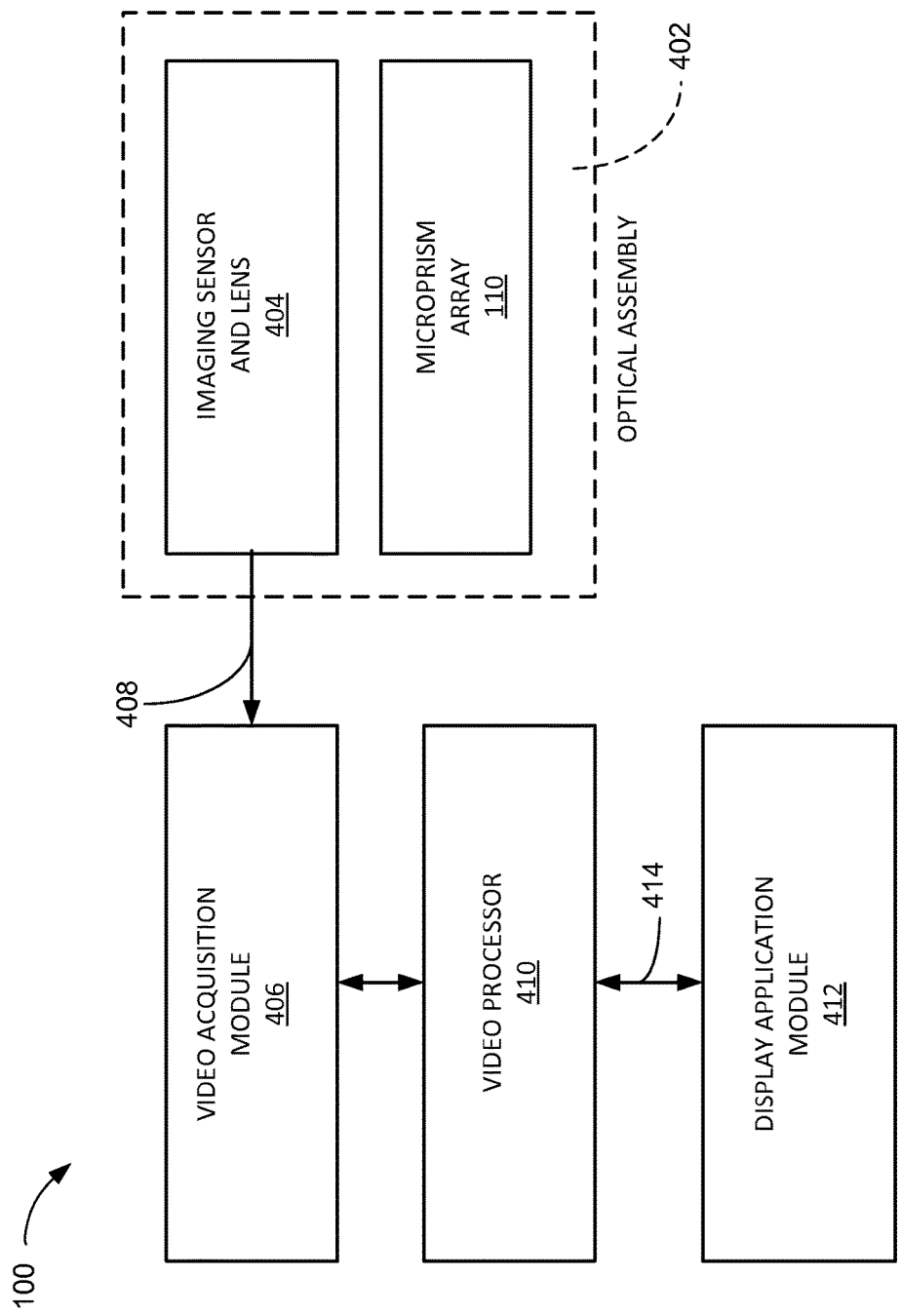
FIG. 4 is a hardware block diagram of the three dimensional image capture system.

Referring now to FIG. 4, therein is shown a hardware block diagram of the three dimensional image capture system 100. The hardware block diagram of the three dimensional image capture system 100 depicts an optical assembly 402 including the microprism array 110 and an optics function 404, having the lens 102 of FIG. 1 and the image capture function 106 of FIG. 1.

The optics function 404 can be coupled to a video acquisition function 406 for transferring a video data 408 from the image capture function 106. The video data 408 can be a stream of pixel data for displaying the left image 124 of FIG. 1 and the right image 126 of FIG. 1. The video acquisition function 406 can be a memory or register structure for receiving and ordering the video data 408. The video acquisition function 406 can perform some amount of pre-processing of the video data 408.

The video acquisition function 406 can be coupled to a video processor 410. The video processor 410 can perform initialization and calibration processes for the video acquisition function 406. The video processor 410 can also identify corresponding points in the left image 124 and the right image 126, in preparation for determining a depthmap (not shown) for the target object 114 of FIG. 1.

The video processor 410 can search the video data 408 for matching correspondence points in the left image 124 and the right image 126. The search for the correspondence points can be performed in a horizontal region across the field of view 204 of FIG. 2. Since the video acquisition function 406 can provide a search buffer as well as a receiving buffer, the video processor 410 can identify all of the correspondence points in the search frame while the receiving frame can be being loaded with the video data 408.

The video processor 410 can be coupled to a display application function 412, through a depthmap bus 414 for transferring the depthmap derived from the left image 124 and the right image 126, for displaying a three dimensional image of the target object 114. The video processor 410 can perform initialization and maintenance functions in the display application function 412. The depthmap bus 414 can convey the depthmap calculated by the video processor 410 and any background video data for the image frame. The depthmap bus 414 can be implemented as a parallel bus, a serial link, or a combination thereof.

The display application function 412 can assemble the three dimensional rendering of the target object 114 for display, transfer, or a combination thereof. The display application function 412 can only render the three dimensional view of the target object 114 if both the left virtual object 118 of FIG. 1 and the right virtual object 120 of FIG. 1 are within the field of view 204 of FIG. 2. A depth sensing region can be defined based on the distance of the target object 114 from the microprism array 110, the field of view 204 of FIG. 2, and the deviation angle (δ) 314 of FIG. 3. The depth sensing region can be calculated by:

$$Z_{pm} = \frac{u_z + f_x}{\left(\frac{\tan(\delta)}{\tan(\phi/2)} - 1\right)} \qquad \text{Equation 9}$$

Where $U_z$ can be the array distance ($U_Z$) 112, $f_x$ can be the horizontal focal length of the three dimensional image capture system 100 from equation 5, δ can be the deviation angle (δ) 314 from equation 3, and φ can be the field of view 204. The depth sensing region $Z_{pm}$ can extend from the microprism array 110 and reduce linearly as a function of the deviation angle (δ) 314 and the distance from the microprism array 110 to the target object 114 of FIG. 1. Any of the video data 408 that falls outside the depth sensing region can be transferred as background data from the video processor 410 to the display application function 412 for rendering the three dimensional image of the video frame.

It has been discovered that the three dimensional image capture system 100 provides a method and apparatus for developing three dimensional images from hardware that was developed for two dimensional applications. The application of the microprism array 110 can generate the left image 124 and the right image 126 for a single instance of the target object 114 and a single instance of the lens 102 of FIG. 1.

The three dimensional image capture system 100 has been described with function functions or order as an example. The three dimensional image capture system 100 can partition the functions differently or order the functions differently. For example, the video processor 410 could couple directly to the optics function 404 without the buffering capability of the video acquisition function 406.

The functions described in this application can be hardware implementation or hardware accelerators in the video processor 410, the video acquisition function 406, or in the display application function 412. The functions can also be hardware implementation or hardware accelerators within the three dimensional image capture system 100 but outside of the video processor 410.

Figure 5:
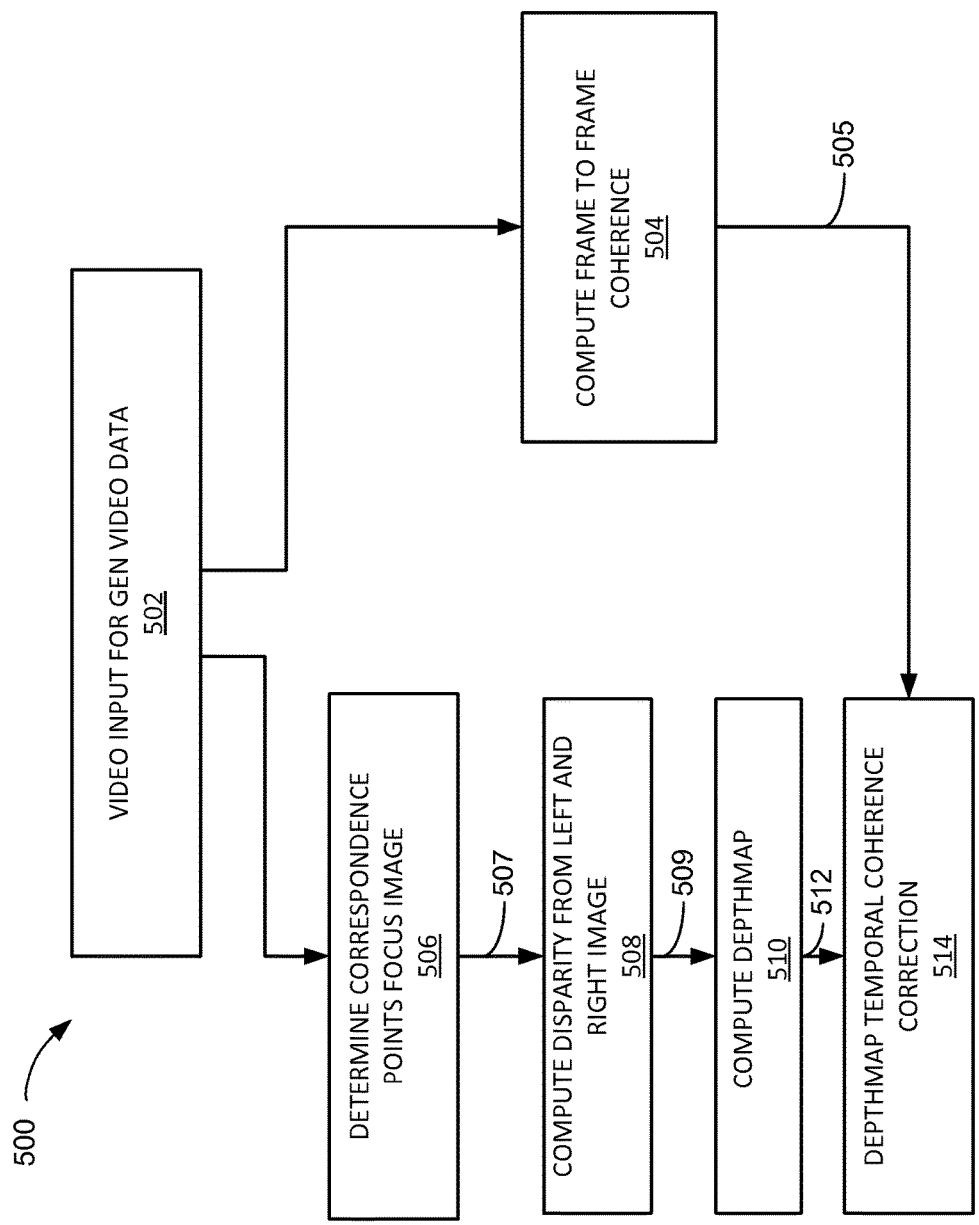
FIG. 5 is a flow chart of a method of operation of a three dimensional image capture system for performing a depthmap generation.

Referring now to FIG. 5, therein is shown a flow chart of a method 500 of the three dimensional image capture system 100 of FIG. 1 in a depthmap generation. The flow chart of the method 500 depicts a video input function 502 for receiving the video data 408 of FIG. 4. The video data 408 can be used in two threads by the video processor 410 of FIG. 4. The video data 408 can be concurrently transferred to a frame coherence function 504 and a correspondence points function 506. The frame coherence function 504 can be a hardware accelerator for calculating the frame to frame coherence of the objects in successive frames by comparing the position, as noted by the coordinates [$x_p$, $y_p$, $z_p$] of objects in the successive frames. The correspondence points function 506 can be a hardware accelerator for parsing the video data in search of correspondence points in the left image 124 and the right image 126. The correspondence points function 506 can perform a horizontal search for a corresponding point 507 in both the left image 124 and the right image 126, which can include, pixel block matching, regional feature matching, or a combination thereof.

The correspondence points function 506 can pass the corresponding points 507 to a compute disparity function 508 for processing. The compute disparity function 508 can calculate the horizontal distance between the corresponding points on a pixel by pixel basis by applying equation 1. The horizontal disparity of the corresponding points can be compiled into a disparity map 509, such as an array containing the disparity values of each of the pixels, used to calculate the absolute depth of the corresponding points 507. The disparity map 509 can compile all of the disparity $d_{px}$ of the pixel regions in a video frame by applying equation 6, as shown above.

The compute disparity function 508 can be coupled to a compute depthmap function 510 for calculating an absolute value of a depthmap 512 based on the disparity map 509 from the compute disparity function 508. The initial calculation of the depthmap 512 can be biased by the instantaneous data provided from the video processor 410 in the compute disparity function 508.

In order to compensate for any error induced between frames of the video data 408, a temporal coherence correction function 514 can receive an adjusted disparity 505 from the frame coherence function 504 and the depthmap 512 from the compute depthmap function 510. The depthmap 512 can be adjusted to maintain the frame to frame coherence and continuity of the three dimensional image provided as the output of the temporal coherence correction function 514. The temporal coherence correction can be performed by applying the adjusted disparity 505, based on the frame to frame changes, as calculated by:

$$d_t' = d_t + \alpha s(d_{t-1} - d_t) \qquad \text{Equation 10}$$

Where the $d_t'$ is the frame adjusted disparity 505, $d_t$ is the disparity calculated for the current frame, and $\alpha s(d_{t-1}-d_t)$ is the frame-to-frame difference in disparity, between the current frame and the previous frame, adjusted by a scaling factor αs. The scaling factor includes s, which is inversely proportional to the motion vector between the two frames. The scaling factor also includes α, which is a heuristic weight that can be adjusted to indicate the importance of the temporal coherence.

It has been discovered that the three dimensional image capture system 100 can provide the three dimensional image based on a single instance of the lens 102 of FIG. 1 and the microprism array 110 of FIG. 1. The video processor 410 can identify correspondence points by the correspondence points function 506, generate the depthmap 512, and adjust it to maintain coherence from frame to frame by the temporal coherence correction function 514. The three dimensional image output from the temporal coherence correction function 514 can be a single frame or a video stream of frames with a three dimensional image of the target object 114.

The method 500 includes: illuminating an image capture function configured to generate video data in a block 502; focusing a left image and a right image, through a lens, on the image capture function in a block 506; horizontally deflecting the left image and the right image from a microprism array in a block 508; and calculating a depthmap from the left image and the right image in the video data in a block 510.

Figure 6:
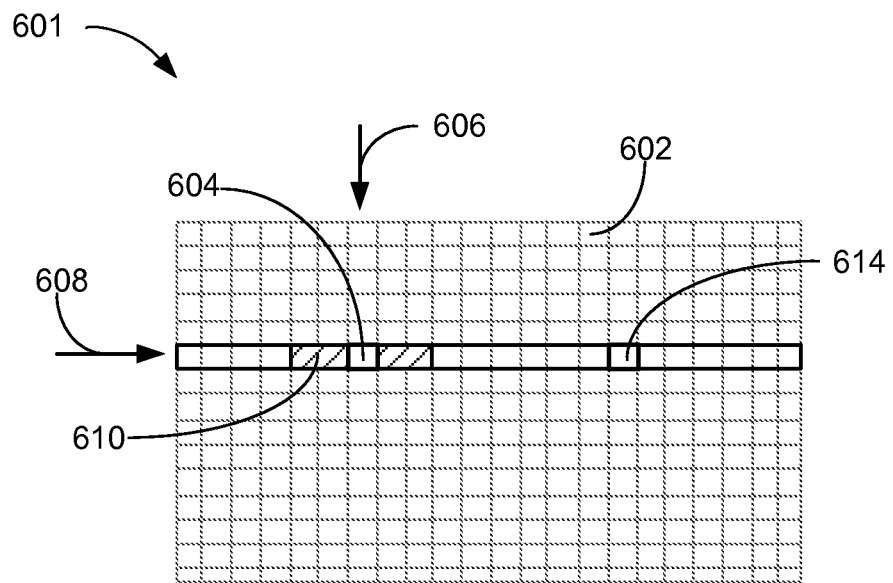
FIG. 6 is an example of a video frame as parsed by the correspondence points function of FIG. 5.

Referring now to FIG. 6, therein is shown an example of a video frame 601 as parsed by the correspondence points function 506 of FIG. 5. The architectural diagram of the video frame 601 depicts pixel regions 602 throughout the video frame 601. The video processor 410 of FIG. 4 can identify a template block 604, located at a column n 606 and a row m 608, as containing a prominent feature of the left image 124 of FIG. 1. The video processor 410 must then identify a correspondence point for the right image 126 of FIG. 1 by a block matching process within the row m 608.

Based on the deviation angle (δ) 314 of FIG. 3, an exclusion area 610 can be imposed on both sides of the template block 604 within the row m 608. The exclusion area 610 can prevent false correspondence matches from occurring within the left image 124. A search for a corresponding block can be performed within a target region 612. The search utilizes a block matching process, having Sum of Squared Difference block matching based on Fast Fourier Transform, to identify a correspondence point 614 within the row m 608.

It is understood that the search for the corresponding block can be limited to the horizontal row m 608, because the $N^{th}$ microprism 302 of FIG. 3 and the $N+1^{st}$ microprism 304 of FIG. 3, each having the prism vertex 305 of FIG. 3 vertically aligned, so the deviation angle (δ) 314 of FIG. 3 is only seen in the horizontal direction. The minimum value of the deviation angle (δ) 314 can determine the exclusion area 610 because each point the left image 124 or the right image 126 will be displaced at least two times the minimum value of the deviation angle (δ) 314.

It has been discovered that the search for the corresponding block can be performed only in the row m 608 because the microprism array 110 only displaces the left image 124 and the right image 126 horizontally due to the prism vertex 305 of the $N^{th}$ microprism 302 and the $N+1^{st}$ microprism 304 being vertically aligned and parallel. Any feature identified in the left image 124 will have a corresponding feature within the same row for the right image 126. This allows the video processor 410 to minimize the search time for the correspondence point 614.

Figure 7:
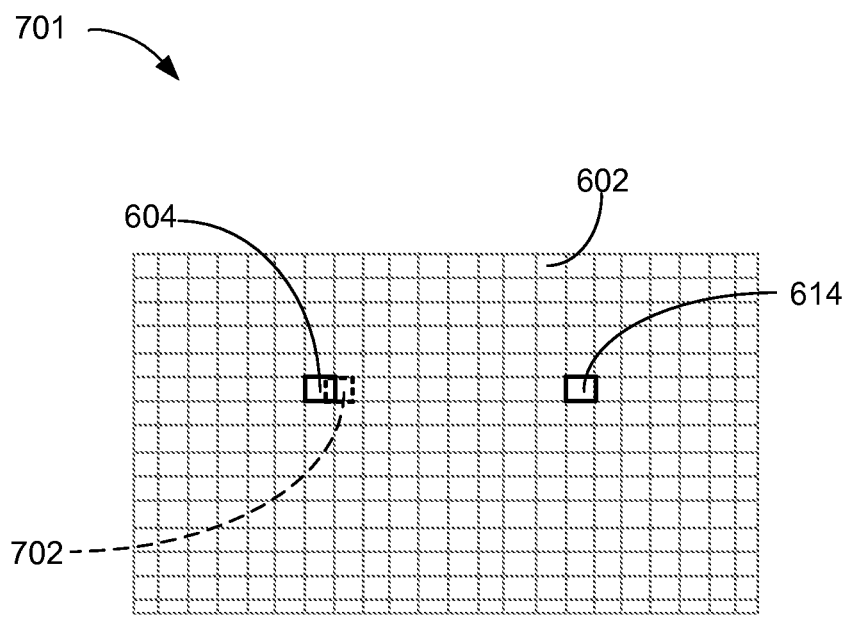
FIG. 7 is an example of a video frame as manipulated by the compute disparity function of FIG. 5.

Referring now to FIG. 7, therein is shown an example of a video frame 701 as manipulated by the compute disparity function 508 of FIG. 5. The architectural diagram of the video frame 701 depicts the template block 604 having been identified by the video processor 410 of FIG. 4 and the correspondence point 614. Once matching pairs of the template block 604 and the correspondence point 614 are found for all of the pixel regions 602 corresponding to the left image 124 and the right image 126, the video processor 410 can compute the pixel disparity for these pairs using their locations in the video frame 701.

During the execution of the correspondence points function 506 the template block 604 can have a match with the corresponding point 614, but the corresponding point 614 can have a stronger match with an offset block 702. The compute disparity function 508 can calculate a disparity for the three blocks that represents the mean value of the disparity between the template block 604 and the corresponding point 614 averaged with the disparity between the corresponding point 614 and the offset block 702. The same disparity value can be assigned to each of the blocks.

The compute disparity function 508 can assign a disparity for all of the pixel regions 602 in the video frame 701. Once all of the pixel regions 602 for the video frame 701 have been calculated, a median filter can be applied to the disparity data, of the computed disparity map, in order to impose smoothness constraints. The median filter can adjust the disparity of each of the pixel region 602 in the video frame 701 by averaging the disparity value of adjacent pixel regions 602.

Figure 8:
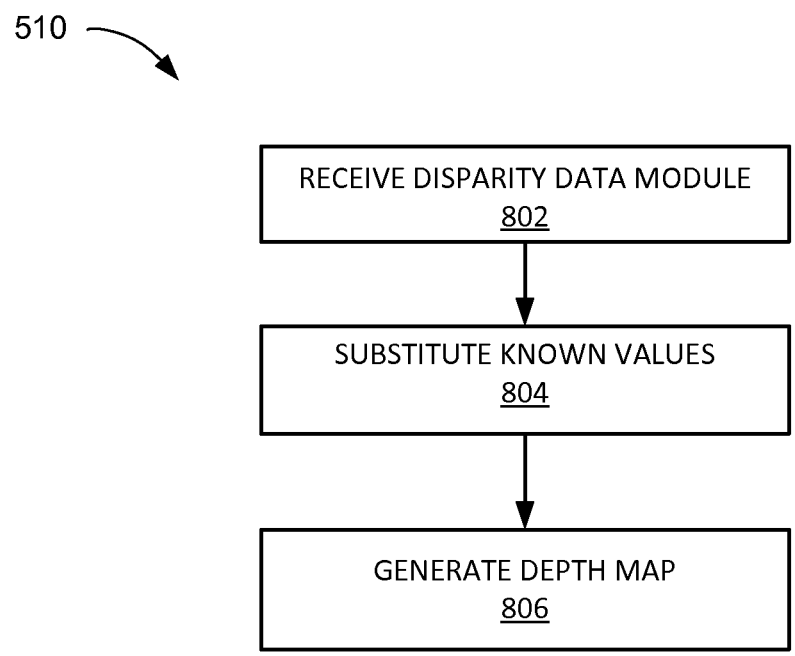
FIG. 8 is a control flow of the compute depthmap function.

Referring now to FIG. 8, therein is shown a flow of the compute depthmap function 510. The flow diagram of the compute depthmap function 510 depicts a receive disparity data function 802, in which the disparity data from all of the pixel regions 602 in the video frame 701 of FIG. 7 can be tabulated. A relation between the real depth $z_p$ of an object point and the disparity $d_{px}$ between the left image 124 of FIG. 1 and the right image 126 of FIG. 1 corresponding to the target object 114 of FIG. 1 is given by Equation 7 as:

$$d_{px} = \frac{2 \cdot z_p \cdot \tan(\delta)}{z_p + u_z + f_x} \cdot \frac{(W/2)}{\tan(\phi/2)} \quad \text{Equation 7}$$

The substitute known values function 804 can replace the known physical values for the set-up of the three dimensional image capture system 100 of FIG. 1. The width 208 of FIG. 2 of the image capture function 106 of FIG. 1 can be W The horizontal field of view 204 of FIG. 2, or angular aperture of the three dimensional image capture system 100 can be $\phi$. The focal distance ($f_x$) 108 of FIG. 1 can be a constant for a single instance of the video frame 701 of FIG. 7. The array distance ($U_z$) 112 of FIG. 1 is known and fixed. The deviation angle ($\delta$) 314 of FIG. 3 is fixed by design. It is understood that the video processor 410 of FIG. 4 can control and detect the focal distance ($f_x$) 108 and the array distance ($U_z$) 112 as part of an autofocus routine during the operation of the three dimensional image capture system 100.

A generate depth map function 806 can generate the picture depth ($z_p$) 116 of FIG. 1 value for each of the pixel regions 602 given the list of constants for a particular design and the disparity $d_{px}$ values from the disparity map 509 of FIG. 5. The generate depth map function 806 can calculate the picture depth $Z_p$ 116 of FIG. 1 value for each of the pixel regions 602 to generate the depthmap 512 of FIG. 5.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A three dimensional image capture system comprising:
   an image capture device configured to generate video data;
   a lens, coupled to the image capture device, configured to focus a left image and a right image;
   a microprism array, coupled to the lens, configured to horizontally deflect the left image and the right image; and
   an image processing unit, coupled to the image capture device, configured to calculate a depthmap from the left image and the right image, captured simultaneously, in the video data including identifying the video data that falls outside a depth sensing region as background data, wherein the depth sensing region extends from the microprism array and reduces linearly based on a deviation angle, of the microprism array, and a distance from the microprism array to a target object.

2. The system as claimed in claim 1 wherein the image processing unit includes a video processor configured to calculate the depthmap.

3. The system as claimed in claim 1 wherein the microprism array includes multiple vertically-aligned uniform triangular prisms configured to deflect a left virtual object and a right virtual object.

4. The system as claimed in claim 1 wherein the image processing unit includes a video acquisition function configured to buffer the video data for identifying a correspondence point.

5. The system as claimed in claim 1 further comprising an illumination source, coupled to the image processing unit, configured to illuminate the target object.

6. The system as claimed in claim 1 wherein:
   the image capture device has a width centered on an optical axis of the lens;
   the lens is spaced a focal distance (fx) from the image capture device;
   the microprism array is spaced an array distance ($U_z$) from the lens opposite the focal distance (fx); and
   the image processing unit is configured to calculate a disparity map from the left image and the right image.

7. The system as claimed in claim 1 wherein the image processing unit includes a video processor configured to calculate a disparity map from a video acquisition function and to calculate the depthmap for a display application function.

8. The system as claimed in claim 1 wherein the microprism array includes multiple vertically-aligned uniform triangular prisms having equal base angles.

9. The system as claimed in claim 1 wherein the image processing unit includes a video acquisition function that provides a memory structure configured to buffer the video data for identifying a disparity map.

10. The system as claimed in claim 1 further comprising an illumination source coupled to the image processing unit configured to illuminate the target object to generate a left virtual object and a right virtual object from the microprism array.

11. A method to capture three dimensional images comprising:
  illuminating an image capture function configured to generate video data;
  focusing a left image and a right image, through a lens, on the image capture function;
  horizontally deflecting the left image and the right image from a microprism array; and
  calculating a depthmap from the left image and the right image, captured simultaneously, in the video data including identifying the video data that falls outside a depth sensing region as background data, wherein the depth sensing region extends from the microprism array and reduces linearly based on a deviation angle, of the microprism array, and a distance from the microprism array to a target object.

12. The method as claimed in claim 11 wherein calculating the depthmap from the left image and the right image includes parsing a disparity map.

13. The method as claimed in claim 11 further comprising horizontally deflecting a left virtual object and a right virtual object for forming the left image and the right image.

14. The method as claimed in claim 11 wherein calculating the depthmap includes buffering the video data for identifying a correspondence point.

15. The method as claimed in claim 11 further comprising illuminating the target object for horizontally deflecting the left image and the right image.

16. The method as claimed in claim 11 further comprising:
  centering a width of the image capture function on an optical axis of the lens;
  determining a focal distance (fx) between the lens and the image capture function;
  recording an array distance ($U_z$) between the lens and the microprism array; and
  calculating a disparity map from the left image and the right image.

17. The method as claimed in claim 11 further comprising calculating a disparity map and calculating the depthmap for a display application function.

18. The method as claimed in claim 11 wherein horizontally deflecting the left image and the right image includes illuminating multiple vertically-aligned uniform triangular prisms having equal base angles configured to generate a deflection angle.

19. The method as claimed in claim 11 wherein calculating the depthmap includes calculating a disparity map while buffering the video data.

20. The method as claimed in claim 11 further comprising illuminating the target object for horizontally deflecting the left image and the right image includes reflecting a left virtual object and a right virtual object from the microprism array.

* * * * *